United States Patent [19]
Watanabe

[11] Patent Number: 5,240,057
[45] Date of Patent: Aug. 31, 1993

[54] HIGH PERFORMANCE PNEUMATIC RADIAL TIRES WITH AUXILIARY BELT LAYERS

[76] Inventor: Shinichi Watanabe, 5-5, Ogawahigashi-Cho 3 Chome, Kodaira City, Tokyo, Japan

[21] Appl. No.: 937,946

[22] Filed: Sep. 1, 1992

[30] Foreign Application Priority Data

Sep. 5, 1991 [DE] Fed. Rep. of Germany ...... 3-226034

[51] Int. Cl.$^5$ .................... B60C 9/18; B60C 9/20
[52] U.S. Cl. ......................... 152/531; 152/526; 152/533; 152/534; 152/536; 152/538
[58] Field of Search ............... 152/534, 536, 538, 531, 152/533, 526

[56] References Cited

U.S. PATENT DOCUMENTS 3,559,714  2/1971  Verdier ..................... 152/536 X

FOREIGN PATENT DOCUMENTS

| 0288987 | 11/1988 | European Pat. Off. |
| 0333628 | 9/1989 | European Pat. Off. |
| 0370749 | 5/1990 | European Pat. Off. |
| 1-30103 | 12/1989 | Japan ................. 152/531 |
| 2-106406 | 4/1990 | Japan ................. 152/531 |
| 4-719063 | 3/1992 | Japan ................. 152/526 |
| 2139574 | 11/1984 | United Kingdom. |

Primary Examiner—Caleb Weston
Assistant Examiner—Adrienne C. Johnstone
Attorney, Agent, or Firm—Sughrue, Mion, Zinn, Macpeak & Seas

[57] ABSTRACT

A high performance pneumatic radial tire includes a tread with plural circumferential grooves, a radial carcass, a belt composed of two belt layers of metal cords, one additional reinforcing layer arranged on a radially outer side of the belt and on an axially central area of the tread, and at least two additional auxiliary layers arranged on each of widthwise opposite side portions of the tread and composed of organic fiber cords. The additional reinforcing layer is composed of cords crossing the metal cords in the belt layer adjacent thereto and inclined with respect to the tire-circumferential direction, and has a width smaller than a minimum width of the belt but greater than a distance between the circumferential grooves located on widthwise outermost sides of the tread, respectively. The organic fiber cords composing at least two additional auxiliary layers extend substantially in the tire-circumferential direction, and at least two additional auxiliary layers have different widths.

5 Claims, 1 Drawing Sheet

FIG_1
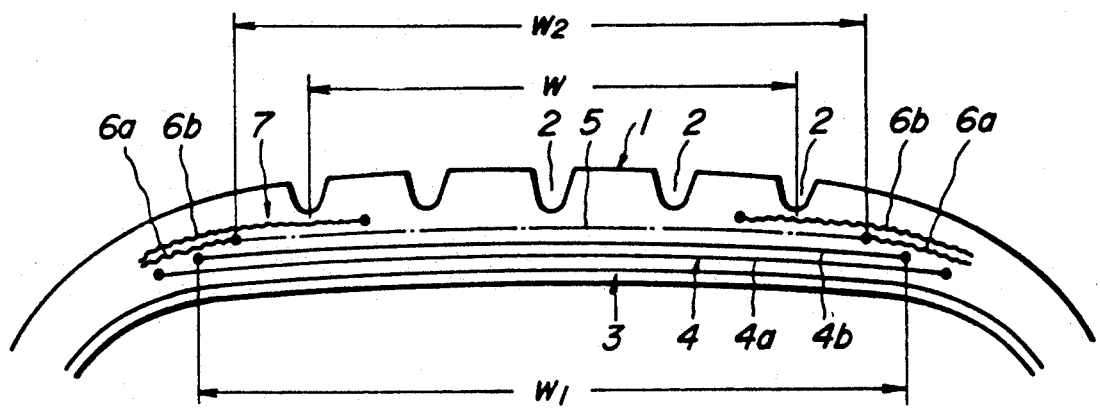
FIG_2
PRIOR ART
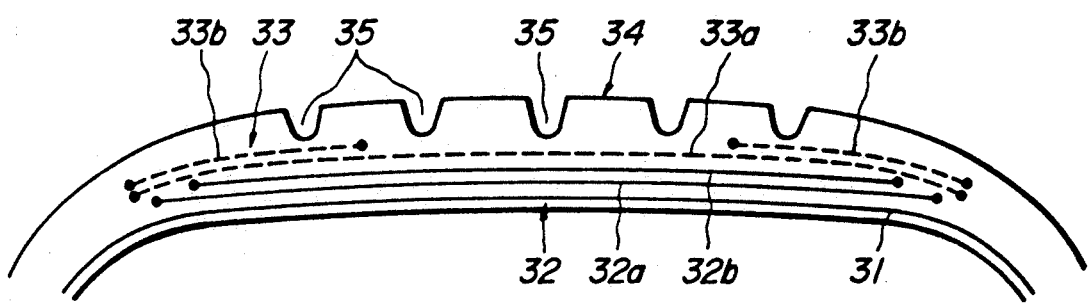

HIGH PERFORMANCE PNEUMATIC RADIAL TIRES WITH AUXILIARY BELT LAYERS

BACKGROUND OF THE INVENTION

1. Field of the Invention

The present invention relates to high performance pneumatic radial tires. Particularly, the invention relates to improvement on the tread-reinforcing structure, and is aimed at prevention of the occurrence of buckling, improvement of the vehicle-cornering stability and reduction in generation of noises.

2. Related Art Statement

FIG. 2 shows a tread-widthwise sectional view of a part of a tread-reinforcing structure of a tire of this kind. In FIG. 2, a carcass 31 is formed from one ply of cords extending substantially at an angle of 90° with respect to the tire circumferential direction, and a belt 32 is arranged on a radially outer side of a crown portion of this carcass 31 over an entire width of a tread. The belt 32 is formed by two belt layers 32a and 32b constituted from metal cords symmetrically arranged at relatively small angles with respect to a tire-circumferential direction such that the metal cords in one of the belt layers cross those in the other belt layer. On a radially outer side of the belt 32 is arranged an additional layer 33 constituted by a so-called cap and so-called layers, the cap being an additional reinforcing layer 33a composed of organic fiber cords extending substantially in the tire-circumferential direction and having a width, for example, slightly greater than that of the belt, and the layers being additional auxiliary layers 33b composed of similar cords extending in the tire-circumferential direction and covering axially side portions of the belt 32, respectively.

In FIG. 2, a treading surface 34 of the tread is formed with circumferential grooves 35 extending in the tire-circumferential direction.

In such a reinforcing structure, mainly the additionally reinforcing layer 33a prevents a central area of the tread from radially outwardly projecting due to centrifugal forces during high speed turning of the tire, and mainly the additionally auxiliary layer 33b prevents the axially side portion of the tread from radially outwardly projecting due to such centrifugal forces during high speed turning. Thereby, durability of the tire at high speeds can be improved.

However, in the case of the tire having such a conventional structure, particularly in which the belt layers 32a and 32b are made of metal cords, a so-called buckling phenomenon occurs that a widthwise central area of the belt 32 is deformed in a ground-contacting area of the tread in such a direction as to go away from the load upon receipt of a load there. Consequently, the ground-contacting pressure of the treading surface 34 of the tread becomes particularly low at a portion sandwiched between the widthwise central area and the circumferential groove provided on each of 7 widthwise outermost sides of the tread. Such a tendency becomes more conspicuous with increase in load.

For this reason, when the road-gripping forces of the tire becomes once lower, the ground-contacting pressure of the tire becomes non-uniform in the width direction of the tread during rotating of the vehicle as mentioned above. Consequently, the road-gripping forces are obliged to rapidly drop, so that tire controllability is largely deteriorated.

Furthermore, in such a conventional tire, since the additional reinforcing layer 33a reinforcing the central portion of the tread increases rigidity of the tread due to its large share of a tension load with the cords extending in the tire-circumferential direction, and causes resonance of the tire, noises of the tire generated unfavorably become greater.

SUMMARY OF THE INVENTION

The present invention has been accomplished through investigations to solve the above-mentioned problems possessed by the conventional high performance pneumatic radial tires. Therefore, an object of the present invention is to provide a high performance pneumatic radial tires, particularly, a tread-reinforcing structure thereof, which can improve cornering stability of a vehicle, and prevent swelling of a part of a central portion of a tread through effectively preventing the buckling of a belt, and effectively suppress occurrence of resonance of the tire during running at high speeds.

The high performance pneumatic radial tire according to the present invention includes a tread having a treading surface formed with a plurality of circumferential grooves extending in a tire-circumferential direction, a carcass composed of at least one ply of cords extending substantially at an angle of 90° with respect to the tire-circumferential direction, a belt arranged on a radially outer side of a crown portion of the carcass and composed of two belt layers of metal cords arranged at relatively shallow angles with respect to the tire-circumferential direction such that the cords in one of the belt layers cross those in the other belt layer, one additional reinforcing layer arranged on a radially outer side of the belt and on an axially central area of the tread, and at least two additional auxiliary layers arranged on each of widthwise opposite side portions of the tread and composed of organic fiber cords, wherein said additional reinforcing layer is composed of cords crossing the metal cords in the belt layer adjacent thereto and inclined with respect to the tire-circumferential direction, and has a width smaller than a minimum width of the belt but greater than a distance between the circumferential grooves located on widthwise outermost sides of the tread, respectively, the organic fiber cords composing said at least two additional auxiliary layers extend substantially in the tire-circumferential direction, said at least two additional auxiliary layers have different widths, a tread-widthwise inner end of the additional auxiliary layer located on a radially inner side of the tire is located adjacent a side edge of the additional reinforcing layer, a tread-widthwise outer end of this auxiliary additional layer is located on a tread-widthwise outer side of the side edge of the belt layer having the maximum width, a tread-widthwise inner end of the additional auxiliary layer located on the radially outer side of the tire is located on an axially inner side of the circumferential groove located on the widthwise outermost side of the tread but on an axially outer side of the center of the tread, and a tread-widthwise outer end of this additional auxiliary layer is located on an axially outer side of the belt layer having the maximum width.

According to the present invention, the following are preferred.

(1) The additional auxiliary layers are constituted by a structural body formed by spirally winding a ribbon-shaped member made of a plurality of rubberized organic fiber cords in the tire-circumferential direction.

(2) The cords composing the additional reinforcing layer are aramid cords, and the cords composing the additional auxiliary layers are nylon cords.

(3) The cords composing the additional reinforcing layer are extended substantially symmetrical with the cords of the belt layer adjacent to this additional reinforcing layer, and a relative angle of the cords composing the additional reinforcing layer with respect to the tire-circumferential direction is substantially equal to that of the cords composing the belt layer adjacent the additional reinforcing layer.

(4) At least two of said additional auxiliary layers at at least one of the axially opposite side portions are constituted by a ribbon-shaped member spirally wound from one side to the other in a given overlapped state. In this case, the term "overlapped state" means that the two additional auxiliary layers are wound such that the overlapped amount is zero.

In the pneumatic radial tire according to the present invention, the cords of the additional reinforcing layer are inclined to cross the cords of the belt layer adjacent thereto, and preferably the relative angle of the cords of the additional reinforcing layer with respect to the tire-circumferential direction is made substantially equal to that of the cords of the belt layer adjacent thereto. In other words, the relative angle of the additional reinforcing layer with respect to the tire-circumferential direction is set in a range of the relative angle of this belt layer ±10°. Thereby, bending rigidity is increased at at least a central portion of the belt, more accurately, at a portion of the belt sandwiched between the circumferential grooves located on the widthwise outermost sides of the tread, so that buckling resistance is effectively improved. Furthermore, the width of the additional reinforcing layer is made greater than the distance between the circumferential grooves on the widthwise outermost sides of the tread but smaller than the minimum width of the belt, so that increase in rigidity on the widthwise opposite side portions of the tread is suppressed, and difference in rigidity between the widthwise opposite side portions and the central portion of the tread is sufficiently decreased to further improve buckling resistance in a given range.

In addition, the buckling resistance is improved by making the rigidity uniform in the tread-width direction even when the tire is finely deformed (the tire rolls quietly), so that deformation of the tire and vibrations of the tread portion are suppressed. As a result, the resonance of the tire is effectively reduced. Moreover, since the cords conventionally required to extend at the central portion of the tread in the tire-circumferential direction and share large tension are omitted, circumferential rigidity of the central portion of the tread is reduced, and vibrations of the tread are suppressed during rolling of the tire to reduce resonance of the tire. That is, tire sounds can be reduced by effectively suppressing vibrations of the tire in both the tread-width and tread-circumferential directions of the tire.

In addition, since at least two additional auxiliary layers composed of the cords extending substantially in the tire-circumferential direction are arranged in each of the axially opposite side portions of the tread, the axially opposite side portions of the tread can be effectively prevented from being radially outwardly swelled due to centrifugal forces during rolling of the tire at high speeds to improve high speed durability.

Further, since the widths of at least two additional auxiliary layers are made different from each other, the tread portion can be effectively prevented from being radially outwardly swelled out due to centrifugal forces during rolling at high speeds. That is, although the magnitudes of the centrifugal forces acting upon widthwise various portions of the tread differ depending upon the material of the belt or the gauge of the tread, the swelling-out amount of the tread portion at high speeds can be controlled and high speed durability can be improved by making the widths of the additional auxiliary layers different from each other.

Furthermore, according to the tire of the present invention, since the tread-widthwise inner end of the additional auxiliary layer located on the radially inner side of the tire is located adjacent the side edge of the additional reinforcing layer, difference in rigidity between the central portion and the axially side portion of the tread is decreased to improve the buckling resistance. Further, since the tread-widthwise outer end of this additional auxiliary layer is located on the widthwise outer side of the belt layer having the maximum width, the swelling out of the tread during rotating of the tire at high speed can be sufficiently suppressed to a location corresponding to the side edge of the belt to further improving durability at high speed.

In addition, the tread-widthwise inner end of the additional auxiliary layer located on the radially outer side of the tread is located on the radially inner side of the circumferential groove located on the widthwise outermost side of the tread but on the radially outer side of the center of the tread, and preferably the additional auxiliary layer is overlapped with the additional reinforcing layer between the axially outermost circumferential groove and the circumferential groove axially inwardly adjacent thereto. By so doing, occurrence of buckling due to the bending of the belt around the axially outermost circumferential groove can be prevented. Further, since the tread-widthwise outer end of this additional auxiliary layer is located on the axially outer side of the side edge of the belt layer having the maximum width, durability at high speed and buckling resistance can be further improved.

In the present invention, when the additional auxiliary layer is constituted by the structural body formed by spirally winding the ribbon-shaped member made of plural rubberized organic fiber cords in the tire-circumferential direction, the efficiency of forming the additional auxiliary layers can be largely improved. This is more remarkable when two or more additional auxiliary layers are constituted by the ribbon-shaped member spirally wound from one side to the other in a given overlapped state.

When the additional reinforcing layer and the additional auxiliary layer are made of aramid cords and nylon cords, respectively, the weight of the tire can be reduced, necessary tensile resistance can be imparted upon the end portions of the belt, and high bending rigidity can be imparted upon the central portion of the belt.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a schematically cross-sectional view of a tread a an embodiment of the present invention; and FIG. 2 is a schematically cross-sectional view of the tread as a conventional tire.

DETAILED DESCRIPTION OF THE INVENTION

In the following, one embodiment of the present invention will be explained based on the drawing.

FIG. 1 is a schematically cross-sectional view of the tread portion of one embodiment of the present invention.

A plurality (Five in FIG. 1) of tire-circumferential grooves 2 are provided in a treading surface 1 of the tread, and extend in a tire-circumferential direction. A carcass 3 is formed from at least one ply (one ply in FIG. 1) composed of cords extending substantially at an angle of 90° with respect to the tire-circumferential direction. A belt 4 is arranged on a radially outer side of a crown portion of the carcass 3. The belt 4 is formed from two belt layers 4a, 4b composed of metal cords arranged at relatively small angles with respect to the tire-circumferential direction such that the metal cords in one belt layer cross those in the other belt layer. An additional reinforcing laye 5 is provided on a radially outer side of the belt 4 in a widthwise central portion of the tread, and two additional auxiliary layers 6a, 6b are provided on the radially outer side of the belt 4 in widthwise opposite sides of the tread. The additional auxiliary layers 6a, 6b are composed of organic fiber cords, and have different widths. The additional reinforcing layer 5 and the additional auxiliary layers 6a, 6b constitute an additional layer 7.

The metal cords of the belt layer 4b adjacent the additional reinforcing layer 5 are set at 22° with respect to the tire-circumferential direction, and the additional reinforcing layer 5 is composed of aramid fibers extending in a direction crossing the metal cords of the belt layer 4b and forming an angle of 30° with respect to the tire-circumferential direction on a side axially opposite to that of the metal cords. The aramid cords have fineness of 1500d/2. The additional reinforcing layer 5 has a width $W = 130$ mm, which is smaller than the minimum width $W_1$ of the belt but greater than a distance $W_2$ between the circumferential grooves 2 located on widthwise opposite sides of the tread.

The additional auxiliary layers 6a, 6b are formed from nylon cords extending substantially at 0° with respect to the tire-circumferential direction. Preferably, each of the additional auxiliary layers 6a, 6b is constituted by a structural body formed by spirally winding a ribbon-shaped member in the tire-circumferential direction. The ribbon-shaped member has a width of, for example, 10 mm, and is formed by rubberizing a plurality of nylon cords.

The additional auxiliary layer 6a located on the radially inner side extends over a width from a location adjacent the widthwise side end of the additional reinforcing layer 5 to a location on the widthwise outer side of the belt layer 4a having the maximum width as shown. The other additional auxiliary layer 6b located on the radially outer side extends over a width from a location located on the widthwise inner side of the widthwise outermost circumferential groove and on the widthwise outer side of the center of the tread, preferably from a central location between the widthwise outermost circumferential groove and the circumferential groove inwardly adjacent to the widthwise outermost circumferential groove, to a location on the widthwise outer side of the side end of the belt layer 4a having the maximum width.

In order to enhance productivity and increase the yield of the ribbon-shaped member, it is preferable that the additional auxiliary layers 6a, 6b are simultaneously formed by spirally winding the above-mentioned ribbon-shaped member from one side to the other in a given overlapped state.

For example, both the additional auxiliary layers 6a, 6b are formed as follows: The ribbon-shaped member is spirally wound from a location corresponding to the tread-widthwise outer ends of the additional auxiliary layers 6a, 6b toward the widthwise inner direction of the tread while the ribbon-shaped member is overlapped by ½ of the width of the ribbon-shaped member between the radially inner and outer sides. When the ribbon-shaped member reaches a location corresponding to the side end of the additional reinforcing layer 5, the ribbon-shaped member is further spirally wound up to a given widthwise inner location of the tread to form a remaining portion of the additional auxiliary layer 6b on the radially outer side while side edges of adjacent turns of the ribbon-shaped member are closely contacted to each other in no overlapped state. The two sets of the additional auxiliary layers located on the widthwise opposite sides of the tread may be formed by spirally winding a single ribbon-shaped member on one widthwise outer end portion of the tread in the overlapped state as mentioned above, while the ribbon-shaped member is continuously skipped from the widthwise inner end of the additional auxiliary layer 6b on this one widthwise opposite side to that of the additional auxiliary layer 6b on the other widthwise opposite side, followed by spirally winding.

According to the tire constructed above, the buckling of the belt can be effectively prevented, and cornering stability of the vehicle can be effectively improved as mentioned above. In addition, the cap layer (90°) required in the conventional belt structure is omitted, so that the circumferential tension in the central portion of the belt is reduced to effectively suppress occurrence of resonance of the tire.

Comparative Experiment

In the following, comparative experiment will be explained between an invention tire and a conventional tire with respect to high speed durability, cornering stability and generation of tire noises.

Test tires

The invention tire and the conventional tire had the tread-reinforcing structures shown in FIGS. 1 and 2, respectively, and both had a tire size of 205/55 ZR 15.

Test methods (1) High speed durability

The tire was fitted to a rim having a size of J6-16, and inflated at an internal pressure of 2.55 kg/cm². Then, the tire was pressed to a rotary drum having a diameter of 1600 mm under pressure of 540 kgf, and a trouble-generating speed was measured when the rotation speed was increased 10 km/h by 10 km/h every lapse of 20 minutes, starting from 150 km/h, and results were evaluated by index taking the result in the conventional tire as 100.

In this test, room temperature was 22° C., and a camber angle and a slip angle were both set at 0°.

(2) Cornering stability

Each of the above tires was used as a front wheel, and run on Nurnberg circuit in Germany. Drivability and cornering stability were evaluated by drivers's feeling.

(3) Tire noises generated

Tire noises generated were evaluated by measurement of noises on passing in a test course and noise test on a table inside room.

Test results

Test results were shown in Table 1.

In Table 1, the greater the index value, the more excellent are the results.

TABLE 1

|  | Convention tire | Invention tire |
|---|---|---|
| High speed durability | 100 | 100 |
| Cornering stability | When the tire exceeded a limit for road-gripping forces during turning, controllability rapidly lowered. | Even when the tire exceeded the limit for road-gripping forces during turning, no rapid reduction in cornering power occurred, and controllability was excellent. |
| Tire noises generated | 100 | 95 (reduced by 5%) |

As is seen from the test results in Table 1, according to the present invention, the occurrence of the buckling of the belt can be prevented, high speed durability can be maintained at a high level, and cornering stability can be advantageously improved.

In addition, the resonance of the tire can be effectively prevented by lowering the circumferential tension in the central portion of the belt, and the noises of the tire generated can be largely reduced.

What is claimed is:

1. A high performance pneumatic radial tire including a tread having a treading surface formed with a plurality of circumferential grooves extending in a tire-circumferential direction, a carcass composed of at least one ply of cords extending substantially at an angle of 90° with respect to the tire-circumferential direction, a belt arranged on a radially outer side of a crown portion of the carcass and composed of two belt layers of metal cords arranged at relatively shallow angles with respect to the tire-circumferential direction such that the cords in one of the belt layers cross those in the other belt layer, one additional reinforcing layer arranged on a radially outer side of the belt and on an axially central area of the tread, and at least two additional auxiliary layers arranged on each of widthwise opposite side portions of the tread and composed of organic fiber cords, wherein said additional reinforcing layer is composed of cords crossing the metal cords in the belt layer adjacent thereto and inclined with respect to the tire-circumferential direction, and has a width smaller than a minimum width of the belt but greater than a distance between the circumferential grooves located on widthwise outermost sides of the tread, respectively; the organic fiber cords composing said at least two additional auxiliary layers extend substantially in the tire-circumferential direction, said at least two additional auxiliary layers have different widths; a tread-widthwise inner end of the additional auxiliary layer located on a radially inner side of the tire is located adjacent a side edge of the additional reinforcing layer; and a tread-widthwise outer end of this auxiliary additional layer is located on a tread-widthwise outer side of the side edge of the belt layer having the maximum width; a tread-widthwise inner end of the additional auxiliary layer located on the radially outer side of the tire is located on an axially inner side of the circumferential groove located on the widthwise outermost side of the tread but on an axially outer side of the center of the tread, and a tread-widthwise outer end of this additional auxiliary layer is located on an axially outer side of the belt layer having the maximum width.

2. The pneumatic radial tire according to claim 1, wherein the additional auxiliary layers are constituted by a structural body formed by a spirally winding ribbon-shaped member made of a plurality of rubberized organic fiber cords in the tire-circumferential direction.

3. The pneumatic radial tire according to claim 1, wherein the cords composing the additional reinforcing layer are aramid cords, and the cords composing the additional auxiliary layers are nylon cords.

4. The pneumatic radial tire according to claim 1, wherein a relative angle of the cords composing the additional reinforcing layer with respect to the tire-circumferential direction is substantially equal to that of the cords composing the belt layer adjacent the additional reinforcing layer.

5. The pneumatic radial tire according to claim 1, wherein at least two of said additional auxiliary layers at at least one of the axially opposite side portions are constituted by a ribbon-shaped member spirally wound from one side to the other.

* * * * *